United States Patent
Makino

(10) Patent No.: US 9,690,112 B2
(45) Date of Patent: Jun. 27, 2017

(54) IMAGE CAPTURING APPARATUS

(71) Applicant: CANON KABUSHIKI KAISHA, Tokyo (JP)

(72) Inventor: Jun Makino, Kokubunji (JP)

(73) Assignee: Canon Kabushiki Kaisha, Tokyo (JP)

( * ) Notice: Subject to any disclaimer, the term of this patent is extended or adjusted under 35 U.S.C. 154(b) by 12 days.

(21) Appl. No.: 14/747,276

(22) Filed: Jun. 23, 2015

(65) Prior Publication Data

US 2015/0381871 A1 Dec. 31, 2015

(30) Foreign Application Priority Data

Jun. 25, 2014 (JP) ................................. 2014-130681

(51) Int. Cl.
| | |
|---|---|
| *G02B 27/28* | (2006.01) |
| *G02B 5/30* | (2006.01) |
| *H04N 5/225* | (2006.01) |
| *H04N 5/232* | (2006.01) |
| *H04N 5/243* | (2006.01) |

(52) U.S. Cl.
CPC ......... *G02B 27/281* (2013.01); *G02B 5/3025* (2013.01); *G02B 27/286* (2013.01); *H04N 5/2254* (2013.01); *H04N 5/23232* (2013.01); *H04N 5/243* (2013.01)

(58) Field of Classification Search
CPC ........... H04N 13/0217; H04N 13/0434; H04N 5/2356; H04N 5/2254; H04N 5/359; G02B 27/26; G02B 27/28; G02B 27/281–27/288; G02B 5/30

See application file for complete search history.

(56) References Cited

U.S. PATENT DOCUMENTS

| | | | | |
|---|---|---|---|---|
| 9,083,957 B2 * | 7/2015 | Hosaka | ............... | H04N 13/0239 |
| 2007/0222781 A1* | 9/2007 | Kondo | ................... | G06T 15/506 |
| | | | | 345/426 |
| 2007/0280669 A1* | 12/2007 | Karim | .................... | G03B 11/00 |
| | | | | 396/155 |
| 2009/0179143 A1* | 7/2009 | Murooka | ............. | G02B 27/281 |
| | | | | 250/225 |
| 2011/0033177 A1* | 2/2011 | Kuroki | ...................... | G03B 7/00 |
| | | | | 396/63 |
| 2011/0043623 A1* | 2/2011 | Fukuta | ............... | G02B 27/0018 |
| | | | | 348/135 |

(Continued)

FOREIGN PATENT DOCUMENTS

| | | |
|---|---|---|
| JP | 2009-162847 A | 7/2009 |
| JP | 2010-266730 A | 11/2010 |
| JP | 2012-199614 A | 10/2012 |

*Primary Examiner* — Michael Osinski
(74) *Attorney, Agent, or Firm* — Cowan, Liebowitz & Latman, P.C.

(57) ABSTRACT

An image capturing apparatus includes: an image sensor in which multiple light receiving elements are arrayed with respect to one lens on an image sensing plane on which an object image is formed by an imaging lens, the lens being arranged such that the exit pupil of the imaging lens and the light receiving elements are in a conjugate relationship; a polarizer arranged at approximately the position of the exit pupil of the imaging lens, and having multiple areas that have different polarization directions corresponding to different areas of the exit pupil; and an image processing unit that generates multiple images corresponding to the areas of the polarizer from output of the light receiving elements.

10 Claims, 15 Drawing Sheets

(56) References Cited

U.S. PATENT DOCUMENTS

| | | | | |
|---|---|---|---|---|
| 2011/0050941 A1* | 3/2011 | Hiramoto | H01L 27/14625 | 348/222.1 |
| 2011/0096185 A1* | 4/2011 | Aoki | H01L 27/14621 | 348/222.1 |
| 2011/0316983 A1* | 12/2011 | Hiramoto | G03B 35/08 | 348/49 |
| 2012/0092668 A1* | 4/2012 | Du | G02B 5/3016 | 356/364 |
| 2012/0112037 A1* | 5/2012 | Hiramoto | G03B 35/08 | 250/206 |
| 2012/0147187 A1* | 6/2012 | Li | G06K 9/3233 | 348/148 |
| 2013/0033575 A1* | 2/2013 | Kobayashi | G02B 27/26 | 348/46 |
| 2013/0083172 A1* | 4/2013 | Baba | G02B 27/26 | 348/49 |
| 2014/0055664 A1* | 2/2014 | Yamagata | G03B 11/00 | 348/360 |
| 2014/0218486 A1* | 8/2014 | Kobayashi | H04N 13/0217 | 348/49 |
| 2015/0062699 A1* | 3/2015 | Hayashi | G02B 27/26 | 359/465 |
| 2015/0146082 A1* | 5/2015 | Kim | H04N 5/2254 | 348/360 |
| 2015/0192758 A1* | 7/2015 | Yamagata | G02B 5/3025 | 348/360 |
| 2015/0206912 A1* | 7/2015 | Kanamori | G02B 26/001 | 250/208.1 |
| 2015/0256733 A1* | 9/2015 | Kanamori | H04N 5/2354 | 348/234 |
| 2016/0029005 A1* | 1/2016 | Sato | H01L 27/14621 | 348/46 |
| 2016/0163752 A1* | 6/2016 | Sambongi | H01L 27/14621 | 348/222.1 |

* cited by examiner

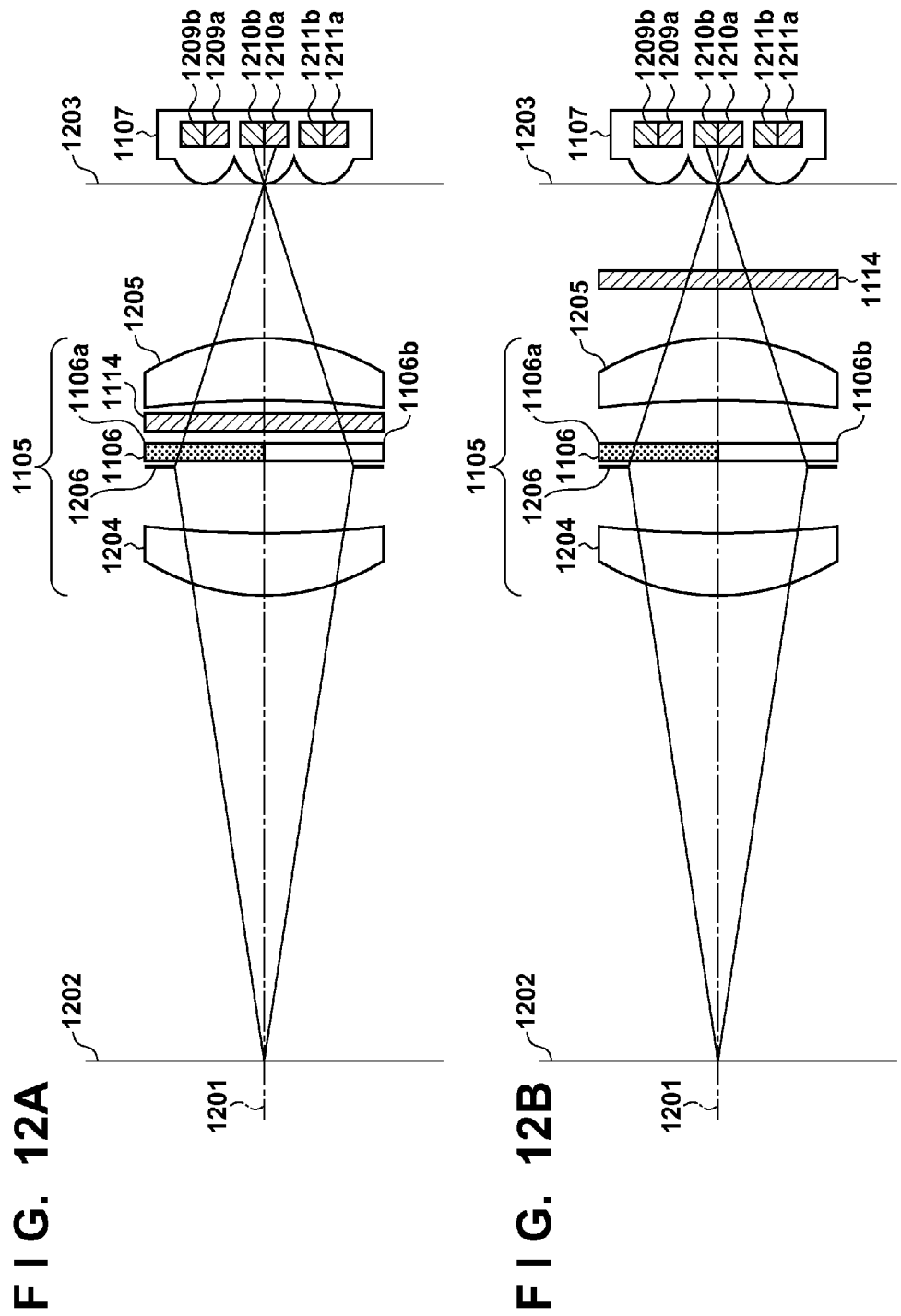

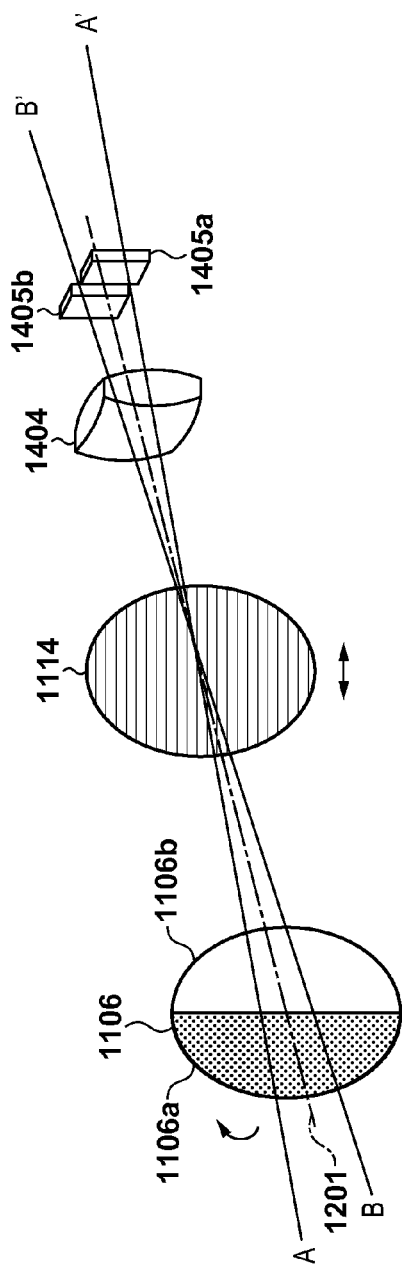
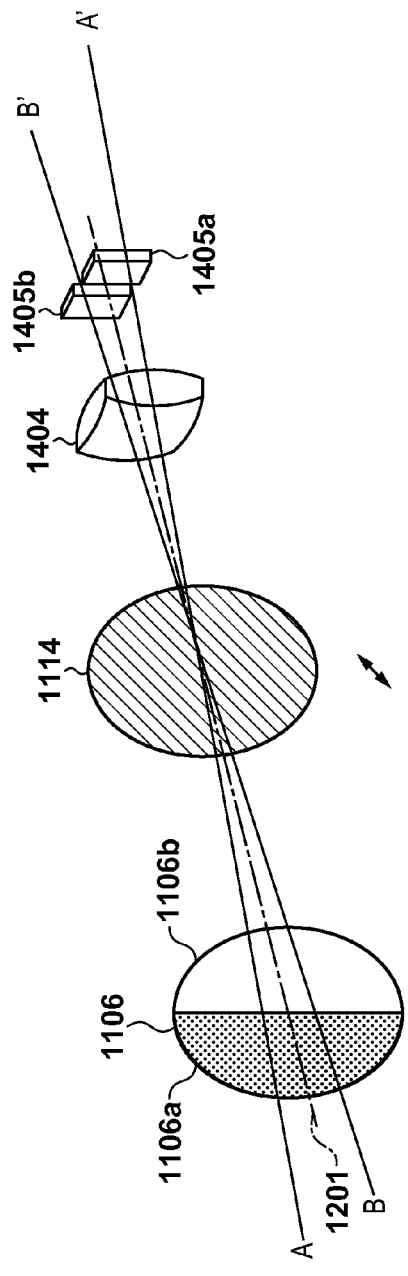
FIG. 14A
FIG. 14B

FIG. 15
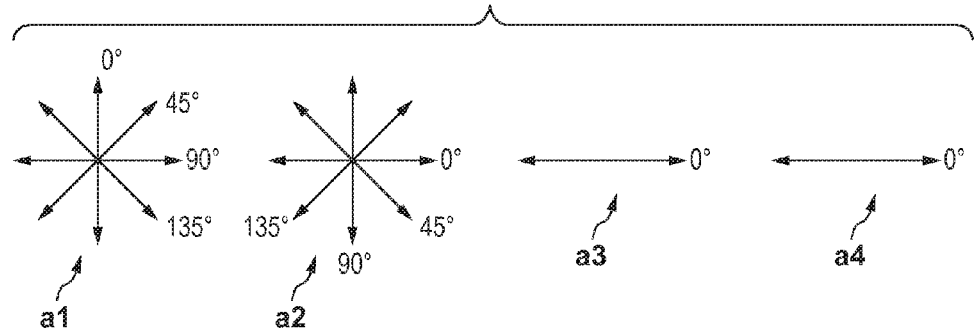
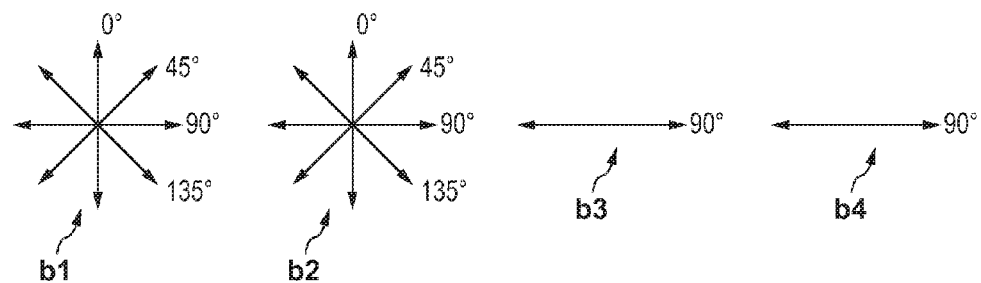
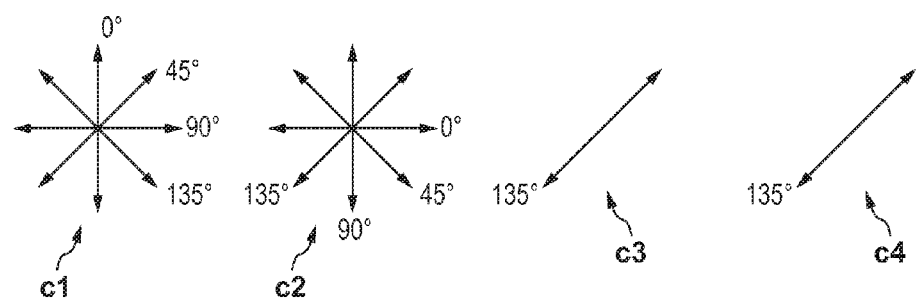
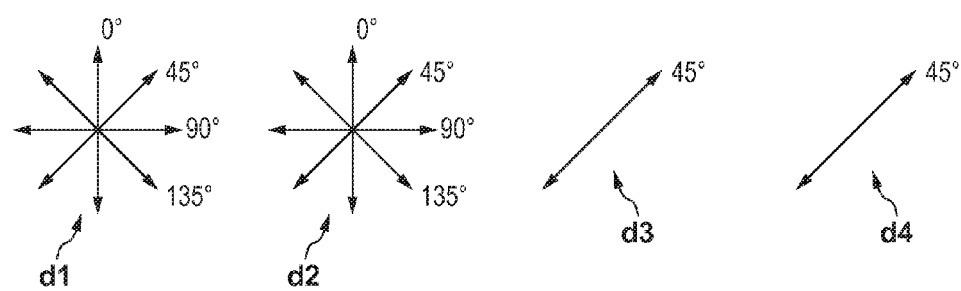

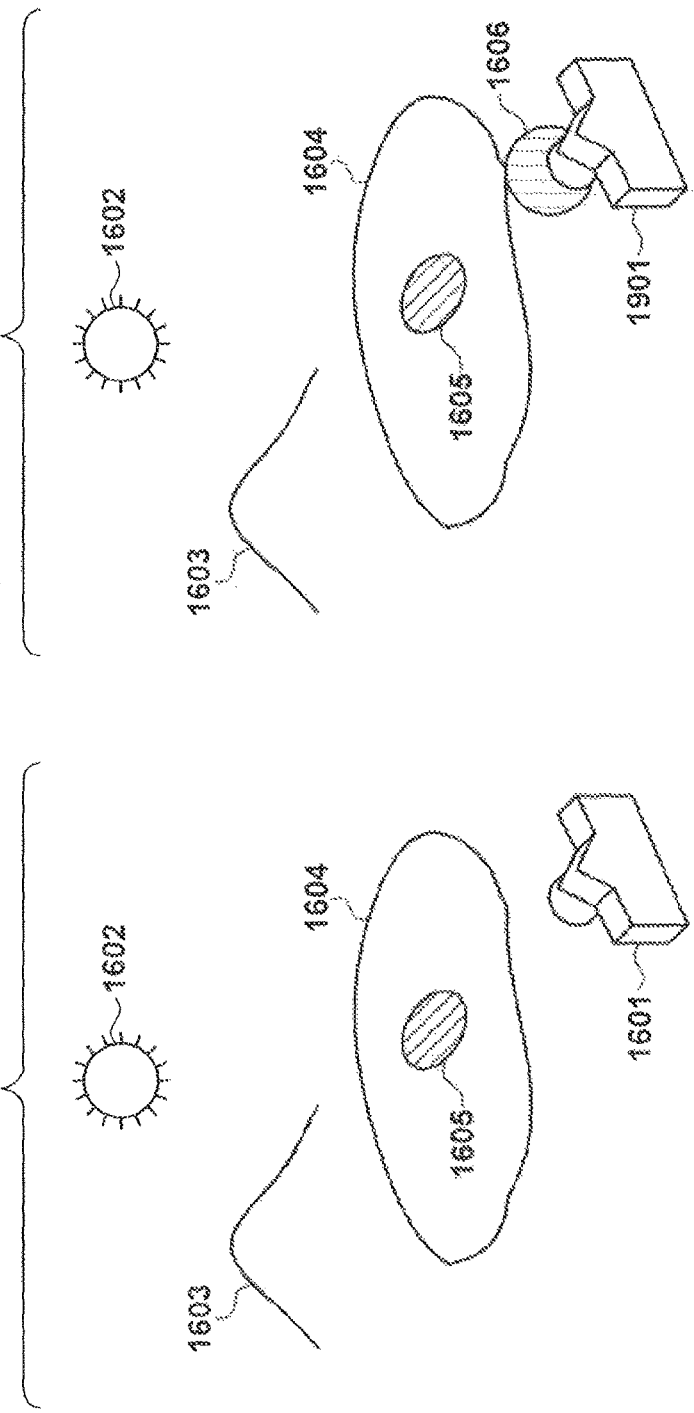

IMAGE CAPTURING APPARATUS

BACKGROUND OF THE INVENTION

Field of the Invention

The present invention relates to a technique in which a specular reflection component in a captured image is detected using a polarizer, and image processing is performed according to the detection result.

Description of the Related Art

Conventionally, a specular reflection component has been removed using a polarizer when capturing an image. For example, when capturing a landscape such as that shown in FIG. 16A, in the case where a camera 1601 captures a scene in which light from a sun 1602 is reflected by the surface of a lake 1604 as shown by a reflection area 1605, the reflection on the surface of the lake is adjusted using a polarizer (PL filter) 1606 as shown in FIG. 16B when performing capturing.

On the other hand, Japanese Patent Laid-Open No. 2010-266730 discloses a method in which a polarizer having mutually different polarization characteristics is placed at the pupil position of a lens, and the polarization state is detected by using a polarizing beam splitter or the like to separate the resulting polarized light in accordance with the polarization when performing capturing. Similarly, Japanese Patent Laid-Open No. 2009-162847 discloses that different polarized images are captured by using multiple polarizers having mutually different polarization directions over the image sensor. Also, Japanese Patent Laid-Open No. 2012-199614 discloses a method in which multiple light receiving elements are provided for each microlens over the image sensor, and AF or the like is performed by dividing the light flux over the pupil.

However, in image capturing that employs conventional polarizers, capturing needs to be performed multiple times in order to check the polarization component, and this is not suited to the capturing of a moving body or the like. Also, in the conventional technology disclosed in Japanese Patent Laid-Open No. 2010-266730, a polarizing beam splitter and multiple image sensors are needed in order to divide the polarized light flux, thus leading to the problem that the structure becomes complex. Also, in Japanese Patent Laid-Open No. 2009-162847, complex polarizers need to be formed over the image sensor surface.

SUMMARY OF THE INVENTION

The present invention has been achieved in light of the problems described above, and provides an image capturing apparatus with which different polarized images can be captured at the same time with a simple configuration.

According to a first aspect of the present invention, there is provided an image capturing apparatus comprising: an image sensor in which a plurality of light receiving elements are arrayed with respect to one lens on an image sensing plane on which an object image is formed by an imaging lens, the lens being arranged such that an exit pupil of the imaging lens and the light receiving elements are in a conjugate relationship; a polarizer arranged at approximately a position of the exit pupil of the imaging lens, and having a plurality of areas that have different polarization directions corresponding to a plurality of different areas of the exit pupil; and an image processing unit that generates a plurality of images corresponding to the plurality of areas of the polarizer from output of the plurality of light receiving elements.

According to a second aspect of the present invention, there is provided an image capturing apparatus comprising: an image sensor in which a plurality of light receiving elements are arrayed with respect to one lens on an image sensing plane on which an object image is formed by an imaging lens, the lens being arranged such that an exit pupil of the imaging lens and the light receiving elements are in a conjugate relationship; an optical rotator arranged at approximately a position of the exit pupil of the imaging lens, and having a plurality of areas that have different rotary polarization directions corresponding to a plurality of different areas of the exit pupil; a polarizer arranged closer to the image sensor than the optical rotator is; and an image processing unit that generates a plurality of images corresponding to the plurality of areas of the optical rotator from output of the plurality of light receiving elements.

According to a third aspect of the present invention, there is provided an image capturing apparatus comprising: an image sensor in which a plurality of light receiving elements are arrayed with respect to one lens on an image sensing plane on which an object image is formed by an imaging lens, the lens being arranged such that an exit pupil of the imaging lens and the light receiving elements are in a conjugate relationship; a polarizer arranged at approximately a position of the exit pupil of the imaging lens, and having a plurality of areas that have different polarization directions corresponding to a plurality of different areas of the exit pupil; an image processing unit that generates a plurality of images corresponding to the plurality of areas of the polarizer from output of the plurality of light receiving elements; and an image compositing unit that, by compositing the plurality of images, generates an image in which specular reflection in an object has been removed or an image in which specular reflection of an object has been enhanced.

According to a fourth aspect of the present invention, there is provided an image capturing apparatus comprising: an image sensor in which a plurality of light receiving elements are arrayed with respect to one lens on an image sensing plane on which an object image is formed by an imaging lens, the lens being arranged such that an exit pupil of the imaging lens and the light receiving elements are in a conjugate relationship; an optical rotator arranged at approximately a position of the exit pupil of the imaging lens, and having a plurality of areas that have different rotary polarization directions corresponding to a plurality of different areas of the exit pupil; a polarizer arranged closer to the image sensor than the optical rotator is; an image processing unit that generates a plurality of images corresponding to the plurality of areas of the optical rotator from output of the plurality of light receiving elements; and an image compositing unit that, by compositing the plurality of images, generates an image in which specular reflection in an object has been removed or an image in which specular reflection of an object has been enhanced.

Further features of the present invention will become apparent from the following description of exemplary embodiments with reference to the attached drawings.

BRIEF DESCRIPTION OF THE DRAWINGS

FIGS. 12A and 12B are diagrams showing an arrangement relationship between parts of an imaging unit according to the third embodiment.

FIGS. 14A and 14B are diagrams showing an optical path relationship between the polarizer and the image sensor according to the third embodiment.

FIG. 15 is a diagram for describing polarization directions according to the third embodiment.

FIGS. 16A and 16B are diagrams showing a capturing method using a conventional polarizer.

DESCRIPTION OF THE EMBODIMENTS

Hereinafter, embodiments of the present invention will be described in detail with reference to the accompanying drawings.

First Embodiment

Figure 1:
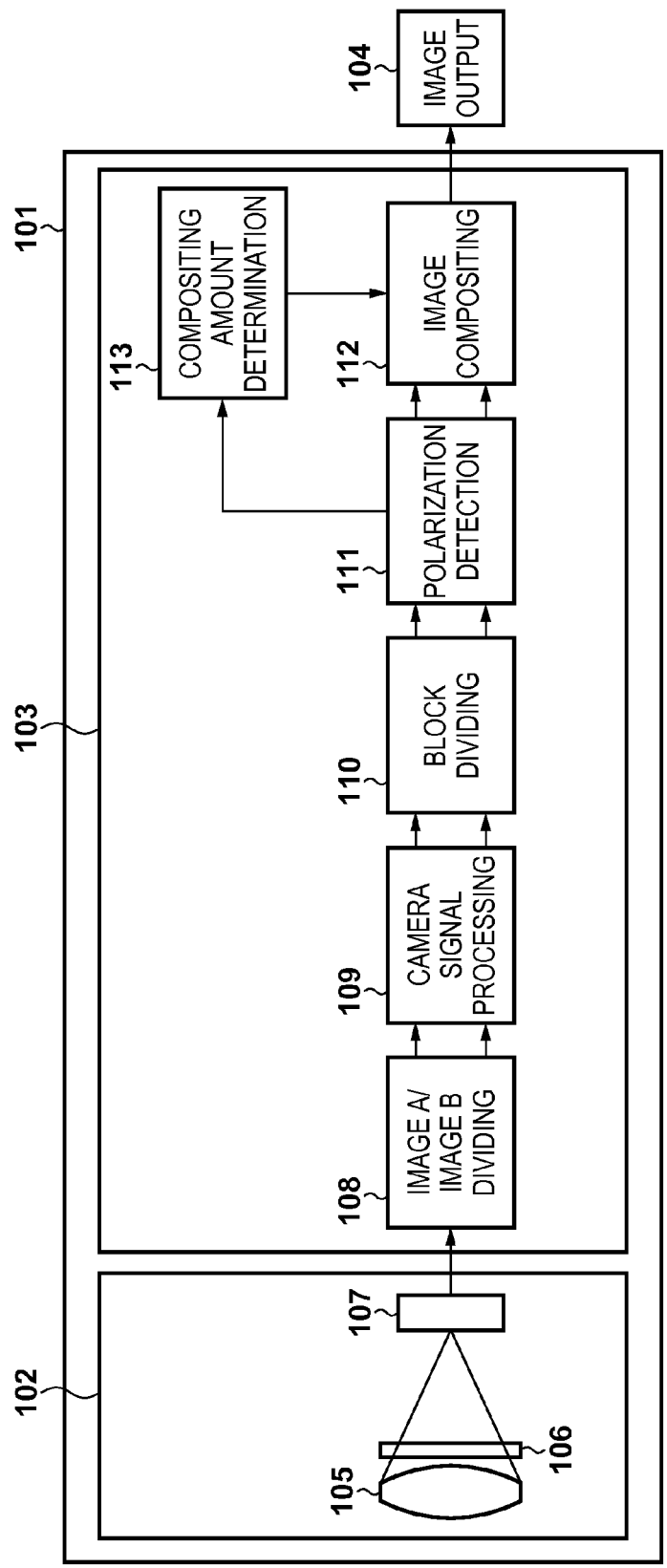
FIG. 1 is a diagram showing a configuration of an image capturing apparatus according to a first embodiment.

The following describes a first embodiment of the present invention with reference to FIGS. 1 to 7E. FIG. 1 shows the overall configuration of a digital camera that is an image capturing apparatus of the present embodiment, FIGS. 2 to 5B will be used to describe positional relationships in an imaging unit, and FIGS. 6 to 7E will be used to describe the content of image processing in the present embodiment.

FIG. 1 is an overall view of the digital camera of the present embodiment. In FIG. 1, 101 indicates the digital camera, 102 indicates an imaging unit, and 103 indicates an image processing unit. In the digital camera 101, an image captured by the imaging unit 102 is subjected to processing by the image processing unit 103, and image output 104 is obtained. The imaging unit 102 includes an imaging lens 105 that forms an object image on an image sensing plane, a polarizer 106 that allows light having a matching polarization direction to pass through, and an image sensor 107 that captures the object image.

Figure 2:
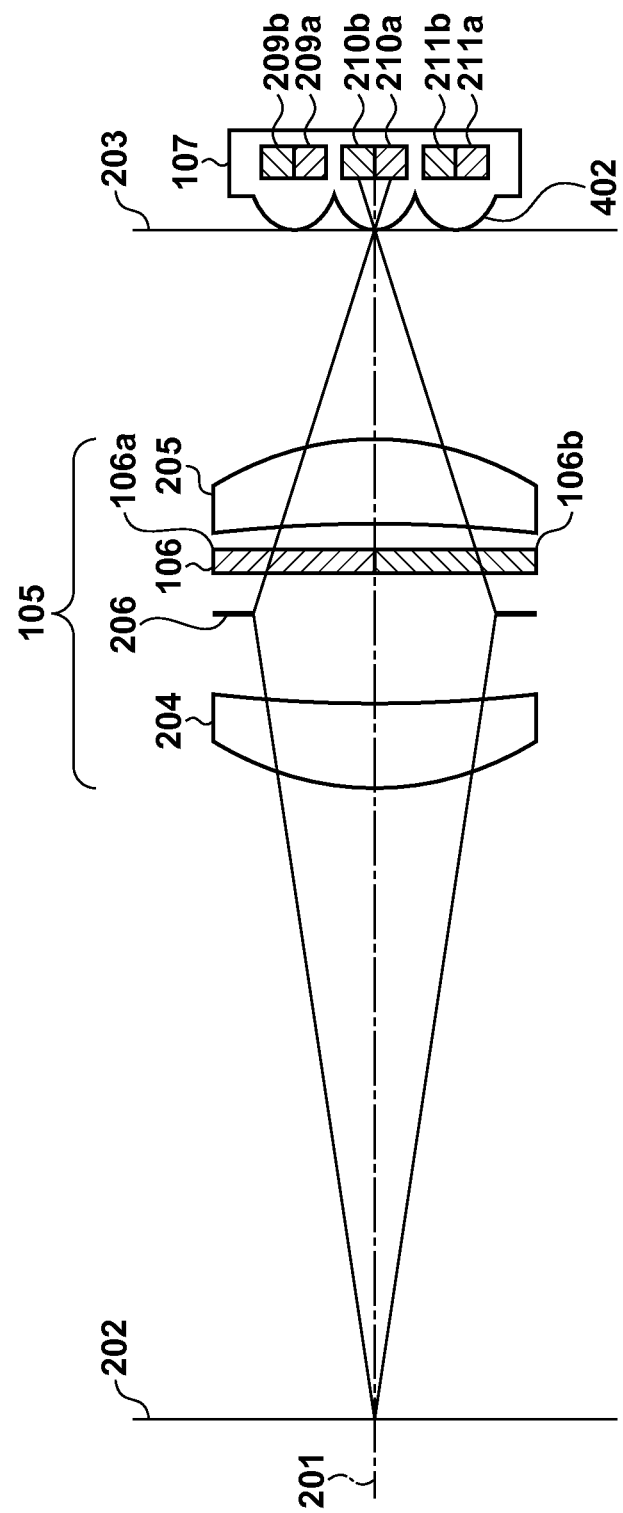
FIG. 2 is a diagram showing an arrangement relationship between parts in an imaging unit according to the first embodiment.

FIG. 2 shows the arrangement relationship between parts in the imaging unit 102. In FIG. 2, the positional relationship between the polarizer and the image sensor is shown when viewed from a direction lateral to the optical axis. In this figure, 201 indicates the optical axis, 202 indicates an object surface, and 203 indicates an image plane. Also, 204 and 205 indicate individual lenses that constitute an imaging lens 105. An image of the object surface 202 is formed on the image plane 203 by these lenses. Although the imaging lens 105 is constituted by the two lenses 204 and 205 in FIG. 2, there is no limitation to this number of lenses, and a configuration with another number of lenses is possible. Also, 206 indicates a diaphragm, which represents the exit pupil position of the imaging lens. Moreover, 106 indicates a polarizer that has different polarization characteristics in an upper side 106a and a lower side 106b in this figure. The polarizer 106 is placed in the vicinity of the diaphragm 206, and is approximately at the position of the exit pupil of the imaging lens.

Figure 3A:
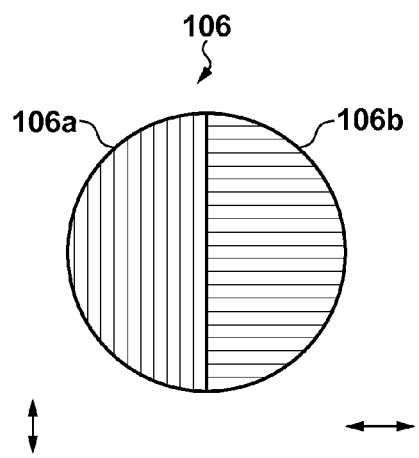
FIGS. 3A and 3B are diagrams showing a structure of a polarizer according to the first embodiment.
Figure 3B:
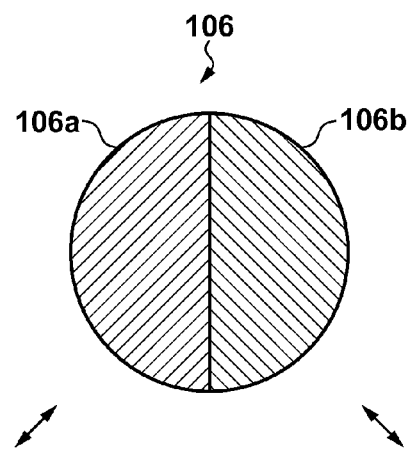

FIGS. 3A and 3B show the structure of the polarizer 106. FIG. 3A is a diagram showing the polarizer 106 as viewed in the optical axis direction. The polarizer 106 is divided into two portions that are symmetrical with respect to the optical axis and have different polarization characteristics. In other words, the polarizer 106 in FIG. 3A has different polarization characteristics (polarization directions) on the left and right sides with the optical axis serving as the center. Specifically, the left side 106a in the figure has a characteristic of allowing polarized light that is polarized in the vertical direction in the figure (which is referred to as the 0-degree direction as necessary hereinafter) to pass through, and the right side 106b in the figure has a characteristic of allowing polarized light that is polarized in the horizontal direction in the figure (which is referred to as the 90-degree direction as necessary hereinafter) to pass through. The polarization directions of the polarizer 106 are not limited to the set of vertical and horizontal, and the left-side and right-side polarization directions need only be different by 90 degrees. In other words, as shown in FIG. 3B, in the case where the left side 106a in the figure has a characteristic of allowing polarized light that is polarized in the direction from the lower left to the upper right (which is referred to as the 45-degree direction as necessary hereinafter) to pass through, the right side 106b in the figure need only have a characteristic of allowing polarized light that is polarized in the direction from the upper left to the lower right (which is referred to as the 135-degree direction as necessary hereinafter) to pass through. Note that the left-right direction in FIGS. 3A and 3B corresponds to the up-down direction in FIG. 2 in order to simplify the description. Specifically, the upper side portion 106a of the polarizer 106 corresponds to the right side 106a in FIG. 3A, and the lower side portion 106b of the polarizer 106 corresponds to the left side 106b in FIG. 3B.

Returning to FIG. 2, 107 indicates an image sensor. FIG. 2 is an example showing an image sensor in the case of generating a 3-pixel image, and shows three on-chip lenses corresponding to pixels lined up vertically, and three corresponding sets of (a total of six) light receiving elements. In FIG. 2, light receiving elements 209a and 209b correspond to the on-chip lens on the upper side, light receiving elements 210a and 210b correspond to the on-chip lens at the center, and light receiving elements 211a and 211b correspond to the on-chip lens on the lower side. In other words, multiple (here, two) light receiving elements are arranged with respect to one on-chip lens. The image sensor 107 is arranged at approximately the focal position of the lenses 204 and 205, and therefore the light receiving elements receive images of the same object at the same time. In other words, as will be described later, the images generated by the light receiving elements are images captured at the same time.

Figure 4A:
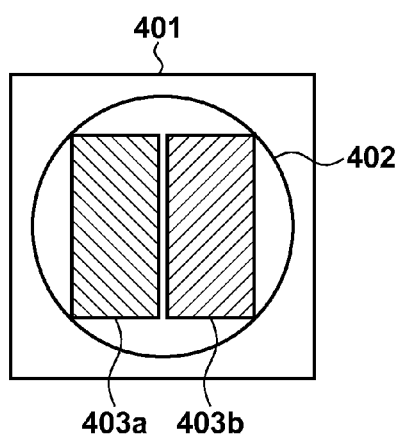
FIGS. 4A and 4B are diagrams showing a structure of one pixel in an image sensor according to the first embodiment.
Figure 4B:
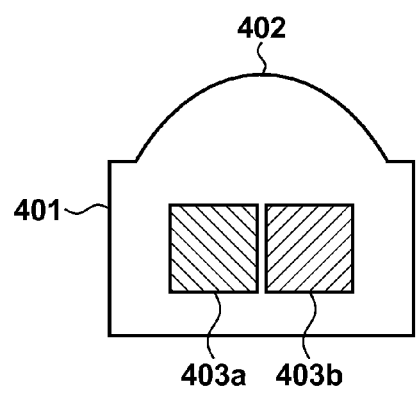

FIGS. 4A and 4B show the structure of one pixel in the image sensor of the present embodiment. FIG. 4A is a diagram showing one pixel as viewed in the optical axis direction, and FIG. 4B is a cross-sectional diagram showing the one pixel as viewed from the side. A pixel 401 is constituted by one on-chip lens 402 and two light receiving elements 403a and 403b. In FIG. 4A, the light receiving elements 403a and 403b are arrayed in the horizontal direction, and specifically the light receiving element 403a is arrayed on the right side of the center in the figure, and the light receiving element 403b is arrayed on the left side. This arraying corresponds to the division direction of the polarizer in FIGS. 3A and 3B. In other words, in the case where the polarization characteristics of the polarizer in FIGS. 3A and 3B are divided into left and right sides as shown in FIGS. 3A and 3B, the light receiving elements 403a and 403b are arrayed on left and right sides in correspondence with the optical paths divided into left and right sides. Conversely, it can be said that the division direction of the polarizer 106 is determined according to the arraying of the light receiving elements 403a and 403b.

Figure 5A:
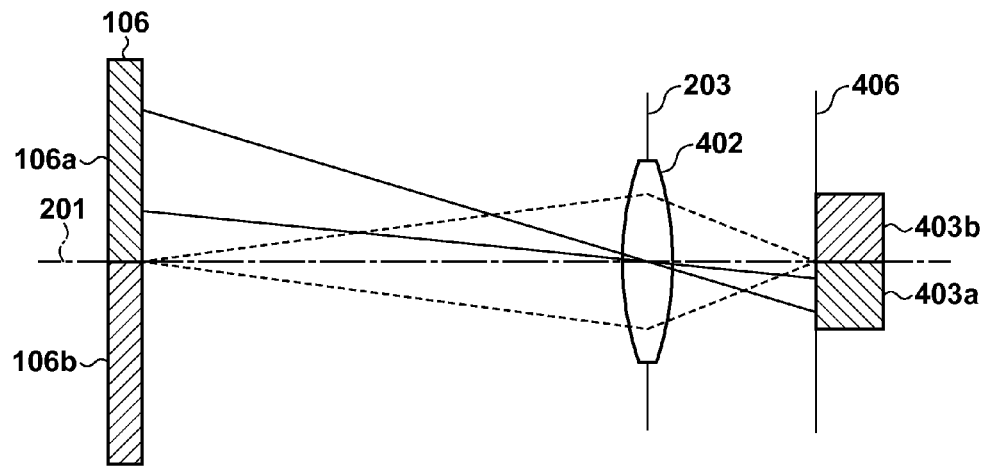
FIGS. 5A and 5B are diagrams showing an optical path relationship between the polarizer and the image sensor according to the first embodiment.
Figure 5B:
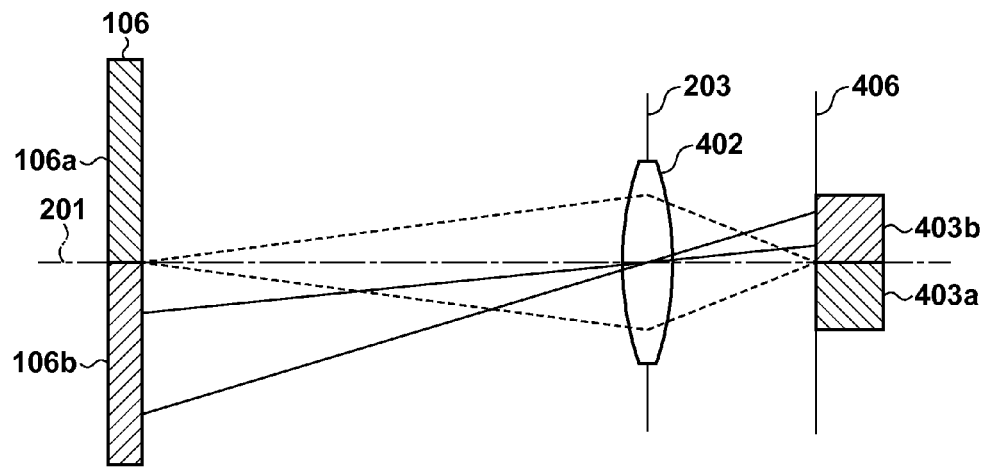

FIGS. 5A and 5B show the optical path relationship between the polarizer 106 and the image sensor 107. In FIGS. 5A and 5B, 201 indicates the optical axis, which is a line connecting the center of the polarizer 106 to the centers of the on-chip lens 402 and the pixel 401. Also, 106 indicates the polarizer, which has different polarization characteristics in the upper portion 106a and the lower portion 106b in the figure. Moreover, 402 indicates the on-chip lens of one pixel, 403a and 403b indicate two light receiving elements that correspond to the one pixel, and the two light receiving elements are shown separated from the on-chip lens in order to describe the optical path relationship. Furthermore, 203 indicates the pupil position of the on-chip lens 402, which is the image plane 203 in FIG. 2. Furthermore, 406 indicates the light receiving surfaces of the light receiving elements 403a and 403b.

FIGS. 5A and 5B show states in which the polarization characteristics of the polarizer are divided in the up-down direction in the figures. Accordingly, the light receiving elements 403a and 403b are arrayed in the up-down direction in the figure, in correspondence with the division of the polarization characteristics of the polarizer. Note that this does not indicate that the division direction of the polarizer and the arraying of the light receiving elements is limited to the vertical direction, and dividing and arraying are merely performed in the up-down direction in the drawings. If the division direction of the polarization characteristics of the polarizer is the left-right direction, the arraying direction of the light receiving elements is also the left-right direction.

Here, the light receiving surfaces 406 and the polarizer 106 are arranged in a conjugate relationship due to the on-chip lens 203, as shown by dashed lines. Specifically, the polarizer 106 and the light receiving surfaces 406 have an image forming relationship, and a light beam that passes through the polarizer 106 is projected onto the light receiving surface 406 that corresponds to the optical path at the position that the light beam passed through. For example, as shown in FIG. 5A, a light beam that has passed through the optical path of the upper portion 106a of the polarizer 106 then passes through the on-chip lens 203, and is projected onto the light receiving surface of the light receiving element 403a on the lower side. Similarly, as shown in FIG. 5B, a light beam that has passed through the optical path of the lower portion 106b of the polarizer 106 then passes through the on-chip lens 203, and is projected onto the light receiving surface of the light receiving element 403b on the upper side. Here, since the upper portion 106a and the lower portion 106b of the polarizer 106 have different polarization characteristics, the light beams received by the light receiving element 403a and the light receiving element 403b have different polarization characteristics.

Returning to FIG. 2, light beams that have passed through the upper portion 106a of the polarizer 106 are received by, among the light receiving elements of the image sensor 107, the light receiving elements 209a, 210a, and 211a that are on the lower side in the figure. Similarly, light beams that have passed through the lower portion 106b of the polarizer 106 are received by, among the light receiving elements of the image sensor 107, the light receiving elements 209b, 210b, and 211b that are on the upper side in the figure. Accordingly, the image output from the set of light receiving elements on the upper side in the figure and the image output from the set of light receiving elements on the lower side in the figure have different polarization characteristics. As previously described, the light receiving elements of the image sensor 208 receive images of the same object at the same time, and therefore the images output from the sets are images that were captured at the same time but have different polarization characteristics. In the following, the image output from the set of light receiving elements 209a, 210a, and 211a will be referred to as the image A, and the image output from the set of light receiving elements 209b, 210b, and 211b will be referred to as the image B.

Figure 6:
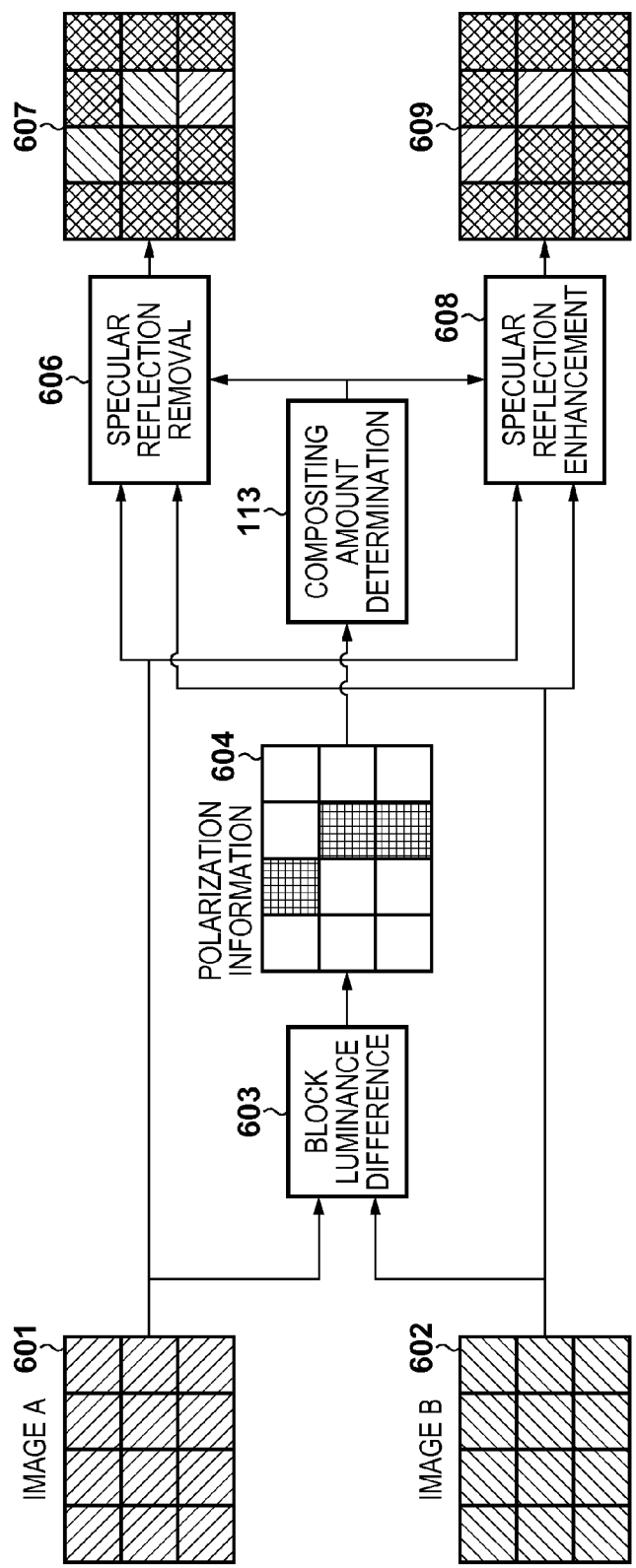
FIG. 6 is a diagram showing image block processing according to the first embodiment.

Returning to FIG. 1, the following describes the content of processing performed by the image processing unit 103 of the digital camera 101 with reference to FIGS. 6 and 7A to 7E. The image processing unit 103 obtains image output 104 from output of the imaging unit 102 by performing the processing described below. FIG. 6 is a diagram for describing processing performed for each image block, and FIGS. 7A to 7E are diagrams showing image states in processing results.

In FIG. 1, 108 indicates an image A/image B dividing unit that divides output of the imaging unit 102 into an image A portion and an image B portion to obtain independent image A output and image B output. Note that the image A/image B division can also be performed by a configuration in which division is performed at the time of output from the image sensor 107.

Also, 109 indicates a camera signal processing unit that generates the image A and the image B by performing necessary camera signal processing on the divided image A output and image B output, such as AE (automatic exposure adjustment), AWB (automatic white balance adjustment), demosaicing, and aperture processing.

Also, 110 indicates a block dividing unit that divides both the image A and the image B into block areas of a predetermined size. FIG. 6 shows the state in which the images have been divided into blocks. FIG. 6 shows the state in which the images have been divided into four blocks horizontally and three blocks vertically. In FIG. 6, 601 indicates the case where the image A image has been divided into blocks, which is indicated by rightward descending diagonal lines, and 602 indicates the case where the image B has been divided into blocks, which is indicated by rightward ascending diagonal lines. The block size is determined according to the number of pixels in the image sensor, the focal length of the lens, the subject distance, and the like. Due to the relationship between the subject distance and the lens position, the image A and the image B are generated as images having parallax, and it is desirable for the block size to be larger than this parallax. Conversely, in the case where there is no parallax, such as the case of the deep focus state in which the object is at infinity, the block size can be set to one pixel.

Also, 111 indicates a polarization detection unit that detects polarization information for each block. For example, for each block, the average luminance in the block is obtained for the image A and the image B, and the difference between these two average luminances is obtained. If the absolute value of the difference between the average block luminances is large, it is determined that the polarization information is to indicate that the degree of polarization is large, and if the absolute value of the difference between the average block luminances is small, it is determined that the polarization information is to indicate that the degree of polarization is small. This result is set as the polarization information for each block. As shown in FIG. 6, a block luminance difference indicated by 603 is obtained for each pair of corresponding blocks in the image A 601 and the image B 602 that have been divided into blocks, and the absolute value of the block luminance difference is recorded as the polarization information 604 for each block. In the polarization information 604 in FIG. 6, locations where the degree of polarization is small are indicated by white blocks, and locations where the degree of polarization is large are indicated by gridline blocks. Specifically, in the case where the coordinates of blocks in the figure are indicated by (row, column), with the upper right block being in row 0 and column 0, the polarization information 604 indicates that the degree of polarization is high in the blocks (0,2), (1,1), and (2,1).

Also, 112 indicates an image compositing unit that composites the image A and the image B according to the degree of polarization. Furthermore, 113 indicates a compositing amount determination unit that determines a compositing amount for each block according to the polarization information and the target image. Here, the target image is, for example, an image with the smallest specular reflection component, that is to say an image in which specular reflection has been removed. In this case, it is sufficient that based on the polarization information, in the case of a block having a high degree of polarization, the corresponding blocks in the image A and the image B are compared, and the block with the lower luminance value is selected and used in compositing. Conversely, if the target image is an image in which the specular reflection component is enhanced, it is sufficient that based on the polarization information, in the case of a block having a high degree of polarization, the block with the higher luminance value is selected out of the corresponding blocks in the image A and the image B, and used in compositing. Furthermore, if the target image is an image between an image in which specular reflection has been removed and an image in which it has been enhanced, it is possible to obtain a compositing ratio according to the polarization information, and accordingly composite corresponding blocks in the image A and the image B.

This will be described below using the image blocks shown in FIG. 6. Here, 113 indicates the compositing amount determination unit. In the case of removing the specular reflection component, based on the polarization information 604, the compositing amount determination unit 113 identifies a high or low degree of polarization for each block, and determines a compositing method for each block. In FIG. 6, 606 indicates a compositing unit in the case of removing specular reflection, and this compositing unit composites images in accordance with an instruction from the compositing amount determination unit 113. Specifically, in the case of a block having a low degree of polarization, the block from the image A or the image B is used as is, or the average thereof is obtained and output. Also, in the case of a block having a high degree of polarization, the block having the lower luminance value is selected and used in compositing. In FIG. 6, 607 indicates a composited image obtained when performing specular reflection component removal. Among the blocks in the image 607, in the case of a block for which the polarization information 604 indicates a low degree of polarization (i.e., a block indicated by a white block), the average of the blocks in the image A and the image B is used in the output image, and these blocks are indicated by diagonal grating. In the case of a block for which the polarization information 604 indicates a high degree of polarization (i.e., a block indicated by a gridline block), the image in either of the blocks in the image A and the image B is used in the output image. This figure shows a state in which, in the case of the block (2,1), the corresponding block in the image A (rightward descending diagonal lines) is output as is, and in the case of the blocks (0,2) and (1,1), the corresponding block in the image B (rightward ascending diagonal lines) is output as is. As a result of compositing the images in this way, the composited image 607 is obtained in which specular reflection component removal has been performed.

Conversely, in FIG. 6, 608 indicates a compositing unit in the case of enhancing specular reflection, and this compositing unit composites images in accordance with an instruction from the compositing amount determination unit 113. Specifically, in the case of a block having a low degree of polarization, similarly to the compositing unit 606, the block from the image A or the image B is used as is, or the average thereof is obtained and output. On the other hand, in the case of a block having a high degree of polarization, the block having the higher luminance value is selected and used in compositing. In FIG. 6, 609 indicates a composited image obtained when performing specular reflection component enhancing. Among the blocks in the image 609, in the case of a block for which the polarization information 604 indicates a low degree of polarization (i.e., a block indicated by a white block), similarly to the composited image 607, the average of the blocks in the image A and the image B is used in the output image, and these blocks are indicated by diagonal grating. In the case of a block for which the polarization information 604 indicates a high degree of polarization (i.e., a block indicated by a gridline block), the image in either of the blocks in the image A and the image B is used in the output image. This figure shows a state in which, in the case of the block (2,1), the corresponding block in the image B (rightward ascending diagonal lines) is output as is, and in the case of the blocks (0,2) and (1,1), the corresponding block in the image A (rightward descending diagonal lines) is output as is. As a result of compositing the images in this way, the composited image 609 is obtained in which the specular reflection component has been enhanced.

FIGS. 7A to 7E are illustrative diagrams of images in the case of performing the above processing. In FIGS. 7A to 7E, a dashed-line rectangle 701 indicates the position of one block in the image. Hereinafter, the block at the 701 position in the image A, the image B, and the like will be referred to as the block 701 of the image A (or the image B).

Figure 7A:
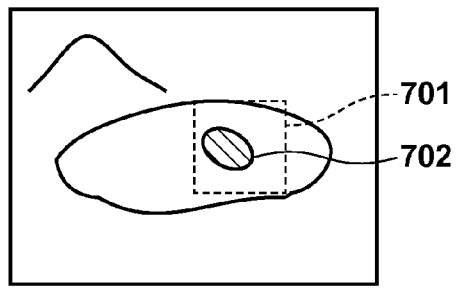
FIGS. 7A to 7E are diagrams showing an example of image processing according to the first embodiment.
Figure 7B:
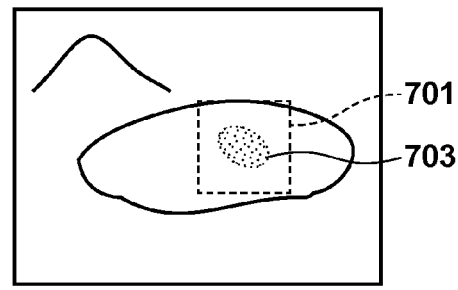
Figure 7C:
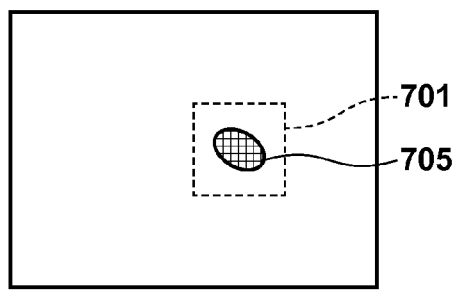

FIG. 7A shows the image A obtained in the present embodiment, and FIG. 7B shows the image B. In FIGS. 7A to 7E, 702 indicates a specular reflection portion included in the image A, and 703 indicates a specular reflection portion included in the image B. The image A and the image B are images having parallax due to the subject distance and the lens position, and it is assumed that the specular reflection portions 702 and 703 are both included in the block 701. In the present embodiment, as previously described, the image A and the image B have different polarization characteristics, and therefore in the case where the specular reflection portion has a polarization characteristic, different luminance values will be indicated in the specular reflection portions 702 and 703. These figures show the case in which the specular reflection component has a high intensity in the polarization characteristic (polarization direction) in the optical path on the image A side. In this case, in the image A (the image having the image A-side polarization characteristic), the specular reflection area 702 has a high luminance, and in the image B (the image having the image B-side polarization characteristic), the specular reflection component 703 has a low luminance. FIG. 7C shows an example in which polarization information is obtained from the image A and the image B. In this figure, a specular reflection area 705 is included in the block 701 in the polarization information. If there is a large luminance difference between the specular reflection area 702 of the image A and the specular reflection area 703 of the image B, a large difference arises in the specular reflection area 705, and a large difference arises between the average luminance values of the blocks. Specifically, in the block 701 in the polarization information 604, the degree of polarization is higher than in other blocks.

Figure 7D:
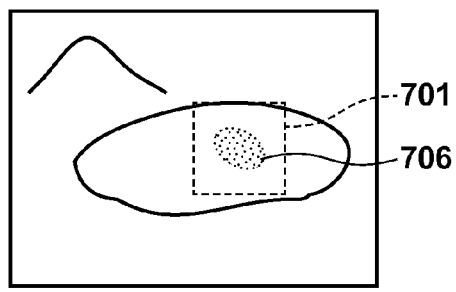
Figure 7E:
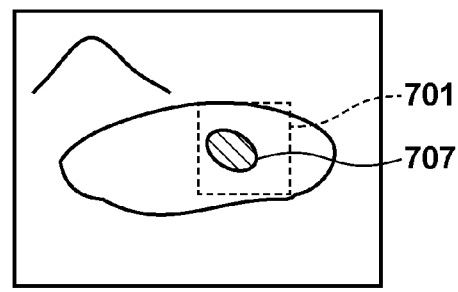

FIGS. 7D and 7E show composited images resulting from performing compositing using this polarization information. FIG. 7D shows a composited image in the case of removing the specular reflection component. In FIG. 7D, in the case of the block 701 in the composited image, out of the blocks in the image A and the image B, the block with the lower luminance is output. In other words, the image in the block 701 of the image B has been output as is. FIG. 7E shows a composited image in the case of enhancing the specular reflection component. In FIG. 7E, in the case of the block 701 in the composited image, out of the blocks in the image A and the image B, the block with the higher luminance is output. In other words, the image in the block 701 of the image A has been output as is.

In the present embodiment, according to the configuration indicated by the imaging unit 102 in FIG. 1, that is to say the configuration described with reference to FIGS. 2 to 5B, images having different polarization information (the image A and the image B) are captured at the same time, polarization information is obtained from each of them, and image output is composited in accordance with the polarization. Since polarization information is obtained from images captured at the same time, even if a moving object is included in the object, it is possible to obtain appropriate polarization information. Also, as described with reference to FIGS. 2 to 5B, in the present embodiment, an image sensor has an array of two light receiving elements arranged with respect to one on-chip lens; a polarizer is arranged at approximately the pupil of the imaging lens, the polarizer having different polarization directions in optical path portions that correspond to the arraying of the light receiving elements; and images having different polarization characteristic are acquired. In other words, it is possible to obtain polarized images with a simple method and without needing a complex structure such as a polarizing beam splitter.

Note that although the present embodiment describes acquiring two polarized images, obtaining polarization information, and performing image compositing, it is easily possible to achieve a configuration in which two polarized images are generated and output, and then polarization information is obtained in subsequent processing.

Second Embodiment

The following describes a second embodiment of the present invention with reference to FIGS. 8 to 10C. In the first embodiment, the optical path is divided into two, and polarization information is obtained from polarized images with two different directions, whereas in the second embodiment, the optical path is divided into four, and polarization information is obtained from polarized images with four different directions.

Figure 8:
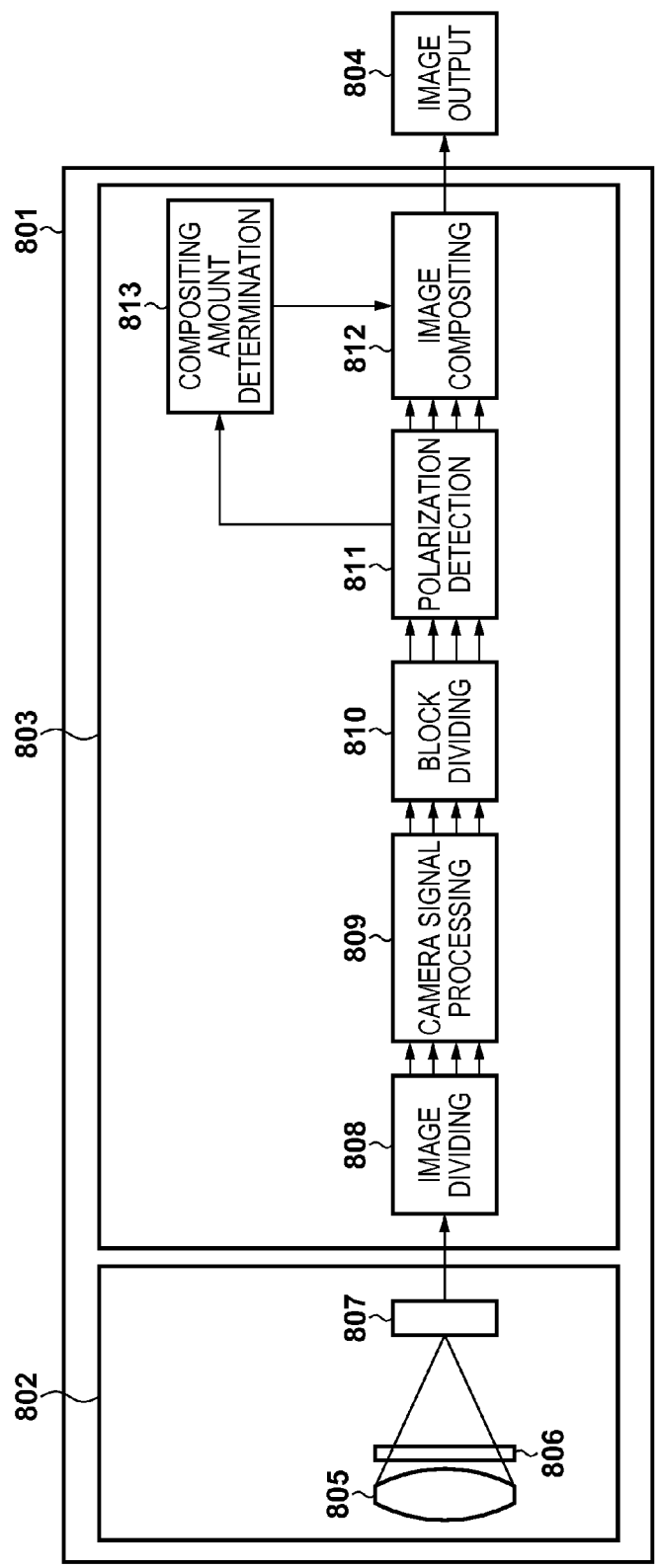
FIG. 8 is a diagram showing a configuration of an image capturing apparatus according to a second embodiment.

FIG. 8 is a diagram showing the overall configuration of a digital camera of the present embodiment. In FIG. 8, 801 indicates the digital camera, 802 indicates an imaging unit, and 803 indicates an image processing unit. In the digital camera 801, an image captured by the imaging unit 802 is subjected to processing by the image processing unit 803, and image output 804 is obtained.

The functions of the portions of the digital camera 801 of the second embodiment are substantially the same as the functions of the portions of the digital camera 101 of the first embodiment. In the second embodiment, the optical path is divided into four, and polarization information is obtained from polarized images with four different directions, and therefore the only difference is that the number of images and the like subjected to processing is higher. Specifically, the imaging unit 802 corresponds to the imaging unit 102, the image processing unit 803 corresponds to the image processing unit 103, and the image output 804 corresponds to the image output 104. Similarly, in the imaging unit 802, an imaging lens 805 corresponds to the imaging lens 105, a polarizer 806 corresponds to the polarizer 106, and an image sensor 807 corresponds to the image sensor 107. The imaging lens 805 may have the same configuration as the imaging lens 105. Furthermore, in the image processing unit 803, an image dividing unit 808 corresponds to the image A/image B dividing unit 108, a camera signal processing unit 809 corresponds to the camera signal processing unit 109, and a block dividing unit 810 corresponds to the block dividing unit 110. Also, a polarization detection unit 811 corresponds to the polarization detection unit 111, an image compositing unit 812 corresponds to the image compositing unit 112, and a compositing amount determination unit 813 corresponds to the compositing amount determination unit 113. In the imaging unit 802 in FIG. 8, 806 indicates the polarizer of the second embodiment, and 807 indicates the image sensor of the second embodiment.

Figure 9A:
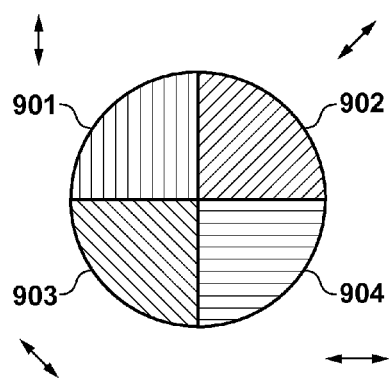
FIGS. 9A and 9B are diagrams showing a structure of a polarizer according to the second embodiment.
Figure 9B:
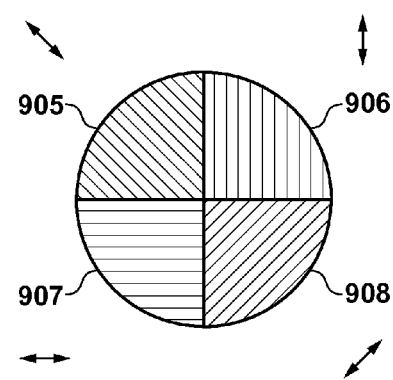

The following describes the structure of the polarizer of the second embodiment with reference to FIGS. 9A and 9B. Also, the structure of one pixel of the image sensor of the second embodiment will be described with reference to FIGS. 10A to 10C. The acquisition of polarization information in the second embodiment will be described thereafter.

FIGS. 9A and 9B are diagrams showing the polarizer of the present embodiment as viewed in the optical axis direction. FIG. 9A shows one example of the configuration of the polarizer. The polarizer in FIG. 9A is divided into four upper, lower, left, and right areas with the optical axis serving as the center, and the regions have different polarization characteristics (polarization directions). Specifically, an upper left side 901 in the figure, an upper right side 902 in the figure, a lower left side 903 in the figure, and a lower right side 904 in the figure respectively have characteristics of allowing the passage of polarized light in the 0-degree direction, polarized light in the 45-degree direction, polarized light in the 135-degree direction, and polarized light in the 90-degree direction. In other words, the polarization directions in the four areas of the polarizer are different from each other by 45 degrees. Note that the correspondence between the four divided areas and the polarization directions is not limited to the case shown in FIG. 9A, and another combination such as that shown in FIG. 9B may be used.

Specifically, in the case shown in FIG. 9B, moving clockwise from the upper left, the areas respectively have characteristics of allowing the passage of 135-degree, 0-degree, 45-degree, and 90-degree polarized light. Other combinations of polarization characteristics are also possible in the present embodiment.

Figure 10C:
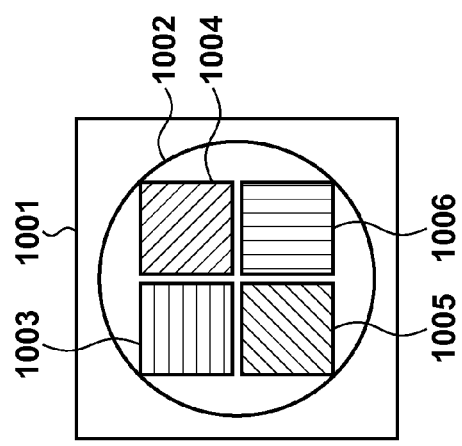
FIGS. 10A to 10C are diagrams showing a structure of one pixel in an image sensor according to the second embodiment.
Figure 10B:
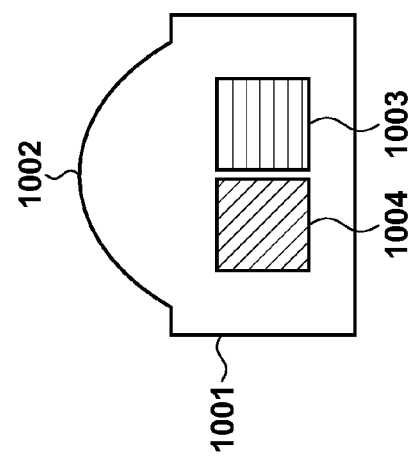
Figure 10A:
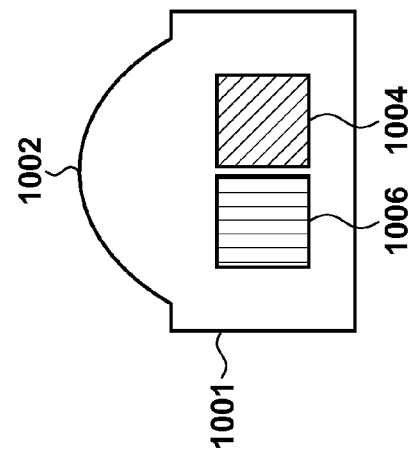

Next, FIGS. 10A to 10C show the structure of one pixel in the image sensor 807 of the present embodiment. FIG. 10A is a diagram showing one pixel as viewed in the optical axis direction, and FIGS. 10B and 10C are cross-sectional diagrams showing the one pixel from the side. FIG. 10B is a cross-sectional view of FIG. 10A from above, and FIG. 10C is a cross-sectional view of FIG. 10A from the right side. In FIGS. 10A to 10C, a pixel 1001 is constituted by one on-chip lens 1002 and four light receiving elements 1003, 1004, 1005, and 1006. This arraying corresponds to the division direction of the polarizer in FIGS. 9A and 9B. Specifically, in the case where the polarization characteristics of the polarizer in FIGS. 9A and 9B are divided into four as shown in FIGS. 9A and 9B, the light receiving elements 1003, 1004, 1005, and 1006 are arrayed at positions corresponding to the divided optical paths.

The arrangement relationship between the parts of the imaging unit 802 of the second embodiment is similar to that in FIG. 2, and the optical path relationship between the polarizer and the image sensor is also similar. In other words, the polarizer is arranged at approximately the pupil position as shown in FIG. 2. Also, in a view in the division direction of the polarization characteristics of the polarizer, the optical path relationship is similar to that shown in FIGS. 5A and 5B. Note that since the optical path is divided into four in the present embodiment, a light beam that passes through the upper left area of the polarizer is projected onto the light receiving surface arranged in the lower right area. Similarly, a light beam that passes through the upper right area of the polarizer is projected onto the light receiving surface arranged in the lower left area, a light beam that passes through the lower left area of the polarizer is projected onto the light receiving surface arranged in the upper right area, and a light beam that passes through the lower right area of the polarizer is projected onto the light receiving surface arranged in the upper left area. In other words, light beams that pass through the four optical paths having different polarization characteristics in the polarizer are projected onto four respective light receiving elements in one pixel. Accordingly, four images having different polarization characteristics are output according to the arraying of the light receiving element in the image sensor. Hereinafter, these four images having different polarization characteristics are described as an image A, an image B, an image C, and an image D, similarly to the first embodiment.

The image processing unit in FIG. 8 performs processing corresponding to the four images obtained in this way. Specifically, the image dividing unit 808 divides the output of the imaging unit 802 into the image A, the image B, the image C, and the image D. The camera signal processing unit 809 and the block dividing unit 810 perform camera signal processing and block division on each of the four images.

The polarization detection unit 811 detects polarization information for each block. Since polarization characteristics in four directions are obtained in the present embodiment, it is possible to calculate not only an intensity, but also a polarization angle as the polarization information. Specifically, given the characteristics of polarized light, the same polarized image will be obtained for polarization directions that are different by 180 degrees, and therefore it is possible to obtain the polarization direction from polarization information with polarization directions of 0 degrees, 45 degrees, 90 degrees and 135 degrees, and the obtained polarization directions can also be used as the polarization information.

The image compositing unit 112 composites the four images, and outputs one image. In this case, it is also possible to select one image from among the four images, output average values, or output the weighted average of the four images. The compositing amount determination unit 813 determines a compositing amount for each block in each of the four images. In this case, it is also possible to remove or enhance polarized light in a specific direction using not only the high/low degree of polarization obtained from the difference between the average luminance values of the blocks, but also using the polarization direction information.

As described above, according to the second embodiment, polarized images are acquired by performing different optical path division compared to the first embodiment. Although the optical path is divided into four in the second embodiment, as long as the arraying of the light receiving elements of the image sensor corresponds to the division of the polarization characteristics of the polarizer, it is possible to similarly generate and composite polarized images with another dividing method as well.

Third Embodiment

The following describes a third embodiment of the present invention with reference to FIGS. 11 to 15. The first embodiment and the second embodiment use a polarizer that has different polarization directions in different optical path portions, but the third embodiment uses a polarizer and an optical rotator that has different rotary polarization directions in different optical path portions.

Figure 11:
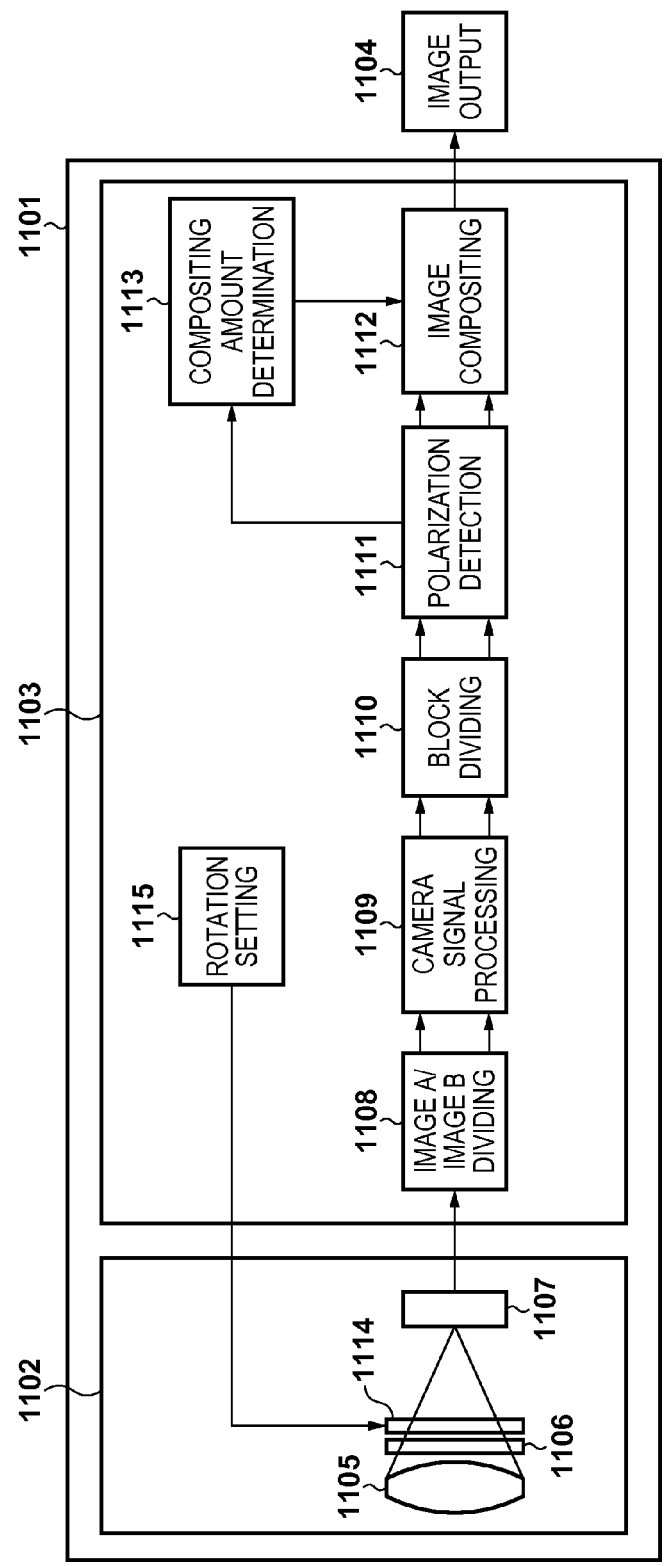
FIG. 11 is a diagram showing a configuration of an image capturing apparatus according to a third embodiment.

FIG. 11 is a diagram showing the overall configuration of a digital camera according to the present embodiment. In FIG. 11, 1101 indicates a digital camera, in which 1102 indicates an imaging unit, and 1103 indicates an image processing unit. In the digital camera 1101, an image captured by the imaging unit 1102 is subjected to processing by the image processing unit 1103, and image output 1104 is obtained.

The functions of the portions of the digital camera 1101 of the third embodiment are substantially the same as the functions of the portions of the digital camera 101 of the first embodiment. In the third embodiment, an optical rotator and a polarizer are used instead of the polarizer 106, and therefore only the configuration of one portion is different. In other words, the imaging unit 1102 corresponds to the imaging unit 102, the image processing unit 1103 corresponds to the image processing unit 103, and the image output 1104 corresponds to the image output 104. Also, in the imaging unit 1102, an imaging lens 1105 and an image sensor 1107 respectively correspond to the imaging lens 105 and the image sensor 107, and need only have the same configurations as them. Furthermore, in the image processing unit 1103, an image A/image B dividing unit 1108 corresponds to the image A/image B dividing unit 108, a camera signal processing unit 1109 corresponds to the camera signal processing unit 109, and a block dividing unit 1110 corresponds to the block dividing unit 110. Also, a polarization detection unit 1111 corresponds to the polarization detection unit 111, an image compositing unit 1112 corresponds to the image compositing unit 112, and a compositing amount determination unit 1113 corresponds to the compositing amount determination unit 113.

In the imaging unit 1102 in FIG. 11, 1106 indicates an optical rotator having characteristics that will be described later. Also, 1114 indicates the polarizer of the third embodiment, which has a constant polarization characteristic in the optical path unlike the first and second embodiments. In other words, only light beams in a single polarization direction are allowed to pass. Also, the polarizer can be rotated in the optical axis direction. Moreover, 1115 indicates a rotation setting unit that rotates the polarizer 1114 so as to change the polarization direction. Although the rotation setting unit 1115 is arranged inside the image processing unit 1103 in the figure, there is no limitation to this, and a configuration is possible in which the polarizer 1114 is mechanically rotated.

FIGS. 12A and 12B show the arrangement relationship between parts in the imaging unit 1102 of the present embodiment. Similarly to FIG. 2, FIGS. 12A and 12B are views in a lateral direction relative to the optical axis in order to facilitate understanding of the relationship between the optical rotator and the image sensor. The majority of the reference numerals in FIGS. 12A and 12B correspond to FIG. 2. Specifically, 1201 indicates the optical axis and corresponds to 201, 1202 indicates the object surface and corresponds to 202, 1203 indicates the image plane and corresponds to 203, 1204 and 1205 indicate lenses and correspond to 204 and 205, and 1206 indicates the diaphragm and corresponds to 206. Also, 1207 indicates the image sensor and corresponds to 207, and 1209a to 1211b indicate light receiving elements and correspond to 209a to 211b.

Also, 1106 indicates the optical rotator that is used in the present embodiment, which has different rotary polarization characteristics in an upper side 1106a and a lower side 1106b in the figure. Also, 1114 indicates the polarizer of the present embodiment. Here, the polarizer of the present embodiment need only be arranged at a position that is after the optical rotator 1106 and before the image sensor 1107. In other words, it may be arranged adjacent to and immediately after the optical rotator 1106 as shown in FIG. 12A, or be arranged between the imaging lens 1205 and the image sensor 1107 as shown in FIG. 12B.

Figure 13A:
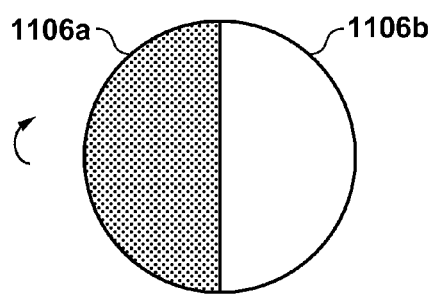
FIGS. 13A and 13B are diagrams showing a structure of an optical rotator according to the third embodiment.
Figure 13B:
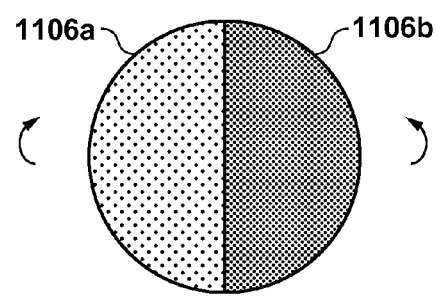

The optical rotator 1106 is placed in the vicinity of the diaphragm 1206, and is at approximately the pupil position of the imaging lens. FIGS. 13A and 13B show the structure of the optical rotator 1207. FIG. 13A is a diagram showing the optical rotator of the present embodiment as viewed in the optical axis direction. The optical rotator of the present embodiment is divided symmetrically with respect to the optical axis, so as to have two different rotary polarization characteristics. Specifically, the optical rotator in FIG. 13A has different rotary polarization characteristics (rotary polarization directions) on the left and right sides with the optical axis serving as the center. More specifically, the left side 1106a in the figure has a characteristic of rotating the polarization direction of light flux 90 degrees clockwise (which is referred to as +90 degrees as necessary hereinafter), and the right side 1106b in the figure has a characteristic of not changing the polarization direction of light flux (which is referred to as 0 degrees as necessary hereinafter for the sake of convenience). The optical rotator 1106 of the present embodiment is not limited to the case where one of the divided rotary polarization characteristics corresponds to 0 degrees (transmission), and the left and right rotary polarization directions need only be different by 90 degrees. In other words, as shown in FIG. 13B, in the case where the left side 1106a in the figure has a characteristic of rotating the polarization direction 45 degrees clockwise (which is referred to as +45 degrees as necessary hereinafter), the right side 1106b in the figure need only have a characteristic of rotating the polarization direction 45 degrees counterclockwise (which is referred to as −45 degrees as necessary hereinafter for the sake of convenience). Note that the left-right direction in FIGS. 13A and 13B corresponds to the up-down direction in FIGS. 12A and 12B in order to simplify the description. In other words, the upper side portion 1106a of the optical rotator 1106 corresponds to the left side 1106a in FIG. 13A, and the lower side portion 1106b of the optical rotator 106 corresponds to the right side 1106b in FIG. 13B.

In the present embodiment, the image sensor is similar to the first embodiment, and one pixel is constituted by one on-chip lens and two light receiving elements as shown in FIGS. 4A and 4B. The arraying of the light receiving elements corresponds to the division direction of the rotary polarization characteristics of the optical rotator, similarly to the correspondence with the division direction of the polarizer in the first embodiment. The optical path relationship between the optical rotator and the image sensor is also similar to the first embodiment shown in FIGS. 5A and 5B. In other words, the light receiving surfaces of the image sensors and the optical rotator of the present embodiment are arranged in a conjugate relationship due to the on-chip lens of the image sensor.

Accordingly, similarly to FIG. 2, in FIGS. 12A and 12B, light beams that have passed through the upper portion 1106a of the optical rotator 1106 pass through the polarizer 1114, and are then received by, among the light receiving elements of the image sensor 1107, the light receiving elements 1209a, 1210a, and 1211a that are on the lower side in the figure. Similarly, light beams that have passed through the lower portion 1106b of the optical rotator 1106 pass through the polarizer 1114, and are then received by, among the light receiving elements of the image sensor 1107, the light receiving elements 1209b, 1210b, and 1211b that are on the upper side in the figure. Accordingly, the image output from the set of light receiving elements on the upper side in the figure and the image output from the set of light receiving elements on the lower side in the figure are images that have been subjected to different optical rotation. Furthermore, due to the light beams passing through the polarizer 1114 after passing through the optical rotator 1106, images that have different polarization characteristics are output.

The following describes aspects of the polarization characteristics and differences in polarization characteristics in the case of changing the rotation direction of the polarizer 1114 with reference to FIGS. 14A, 14B, and 15.

FIGS. 14A and 14B correspond to views of FIGS. 5A and 5B of the first embodiment in an oblique direction. In FIGS. 14A and 14B, 1201 indicates the optical axis, 1106 indicates the optical rotator, 1114 indicates the polarizer, 1404 indicates the on-chip lens, and 1405a and 1405b indicate light receiving elements. The optical rotator 1106 and the light receiving elements 1405a and 1405b are arranged in a conjugate relationship due to the on-chip microlens 1404, as previously described. In FIGS. 14A and 14B, the optical rotator 1106 has different characteristics with respect to the left and right optical paths, light flux that passes through the left side 1106a is rotated +90 degrees, and light flux that passes through the right side 1106b passes through as is. Here, as shown by a line A-A', the light flux that passes through the left side 1106a of the optical rotator travels from the left side 1106a of the optical rotator, passes through the polarizer 1114 and the on-chip microlens 1404, and is incident on the light receiving element 1405a. Similarly, as shown by a line B-B', the light flux that passes through the right side 1106b of the optical rotator travels from the left side 1106b of the optical rotator, passes through the polarizer 1114 and the on-chip microlens 1404, and is incident on the light receiving element 1405b. FIG. 14A shows the case where the polarization direction of the polarizer 1114 is the 90-degree direction, and FIG. 14B shows the case where the polarization direction is the 45-degree direction.

FIG. 15 is a diagram showing states of polarization of light flux at various positions in the optical path diagrams of FIGS. 14A and 14B. In FIG. 15, a1, b1, c1, and d1 indicate the polarization states of light flux that is incident on the optical rotator 1106. Similarly, a2, b2, c2, and d2 indicate the polarization states of light flux that is incident on the polarizer 1114 after being incident on the optical rotator 1106; a3, b3, c3, and d3 indicate the polarization states of light flux after being incident on the polarizer 1114; and a4, b4, c4, and d4 indicate the polarization states of light flux that is incident on the light receiving element 1405a or 1405b. Also, a1, a2, a3, and a4 indicate the polarization states of light flux A-A' in FIG. 14A; and b1, b2, b3, and b4 indicate the polarization states of light flux B-B' in FIG. 14A. Similarly, c1, c2, c3, and c4 indicate the polarization states of light flux A-A' in FIG. 14B; and d1, d2, d3, and d4 indicate the polarization states of light flux B-B' in FIG. 14B.

For example, in the case of the light flux A-A' in FIG. 14A, at a1 before being incident on the optical rotator 1106, the light flux is made up of random light beams, and is incident on the optical rotator 1106 without being polarized or optically rotated. Also, with a1 in FIG. 15, the upward polarization direction is indicated as 0 degrees. Next, as shown by a2, which is the result of passing through the right side 1106a of the optical rotator, the light flux is optically rotated +90 degrees. In other words, the light flux having a 0-degree direction before incidence is rotated +90 degrees so as to become horizontal light in the figure. Next, in the case of passing through the polarizer 1114, only the 90-degree direction light is selected out of the incident light. Specifically, as shown by a3, the light flux that is polarized in the 90-degree direction passes through the polarizer 1403. Thereafter, this light flux passes through the on-chip microlens 1404 and is incident on the light receiving element 1405a. Due to not being subjected to polarization or optical rotation in this process, the light flux that is incident on the light receiving element 1405a is light flux that is polarized in the 90-degree direction as shown by a4. As a result, light flux that had a 0-degree direction before being incident on the optical rotator 1106 is incident on the light receiving element 1405a.

Next, in the case of the light flux B-B' in FIG. 14B, at b1 before being incident on the optical rotator 1106, similarly to a1, the light flux is made up of random light beams, and is incident on the optical rotator 1106 without being polarized or optically rotated. Next, as shown by b2, which is the result of passing through the left side 1106b of the optical rotator, the light flux merely passes through, and thus has not been polarized or optically rotated. In other words, the light flux having a 0-degree direction before incidence remains unchanged with a 0-degree direction. Next, in the case of passing through the polarizer 1114, only the 90-degree direction light is selected out of the incident light. Specifically, as shown by b3, the light flux that is polarized in the 90-degree direction passes through the polarizer 1114. Thereafter, this light flux passes through the on-chip microlens 1404 and is incident on the light receiving element 1405b. Due to not being subjected to polarization or optical rotation in this process, the light flux that is incident on the light receiving element 1405b is light flux that is polarized in the 90-degree direction as shown by b4. As a result, light flux that had a 90-degree direction before being incident on the optical rotator 1106 is incident on the light receiving element 1405b.

In other words, in the case of the light flux A-A' in FIG. 14A, light that was polarized in the 0-degree direction before incidence is incident on the light receiving element 1405a, and in the case of the light flux B-B', light that was polarized in the 90-degree direction before incidence is incident on the light receiving element 1405b.

Returning to the description of FIG. 12A, light beams that have passed through the upper portion 1106a of the optical rotator 1106 are subjected to +90-degree optical rotation and then pass through the polarizer 1114, and thus light beams that were polarized in the 0-degree direction before incidence are received by, among the light receiving elements of the image sensor 1107, the light receiving elements 1209a, 1210a, and 1211a that are on the lower side in the figure. Similarly, light beams that have passed through the lower portion 1106b of the optical rotator 1106 pass through the polarizer 1114 as is, and thus light beams that were polarized in the 90-degree direction before incidence are received by, among the light receiving elements of the image sensor 1107, the light receiving elements 1209b, 1210b, and 1211b that are on the upper side in the figure. In other words, the light beams that are received by the light receiving elements 1209a, 1210a, and 1211a on the lower side are light beams that were polarized in the 0-degree direction, and the light beams that are received by the light receiving elements 1209b, 1210b, and 1211b on the upper side are light beams that were polarized in the 90-degree direction. Accordingly, light beams having polarizations that are different from each other by 90 degrees are received. Accordingly, similarly to the first embodiment, the image output from the set of light receiving elements on the upper side in the figure and the image output from the set of light receiving elements on the lower side in the figure are images that have different polarization characteristics. Specifically, the image A having a polarization characteristic in the 0-degree direction and the image B having a polarization characteristic in the 90-degree direction are output. Similarly to the first embodiment, the light receiving elements of the image sensor 1107 receive images of the same object at the same time, and therefore the images output from the sets are images that were captured at the same time but have different polarization characteristics.

The following describes the case shown in FIG. 14B, that is to say the case where the polarizer 1114 is rotated and allows the passage of polarized light in the 45-degree direction.

Returning to FIG. 15, in the case of the light flux A-A' in FIG. 14B, at c1 before being incident on the optical rotator 1106, the light flux is made up of random light beams, and is incident on the optical rotator 1106 without being polarized or optically rotated. Next, as shown by c2, which is the result of passing through the right side 1106a of the optical rotator, the light flux is optically rotated +90 degrees. In other words, the light flux having a 0-degree direction before incidence is rotated +90 degrees so as to become horizontal light in the figure. Next, in the case of passing through the polarizer 1114, only the 135-degree direction light is selected out of the incident light. Specifically, as shown by c3, the light flux that is polarized in the 135-degree direction passes through the polarizer 1114. Thereafter, this light flux passes through the on-chip microlens 1404 and is incident on the light receiving element 1405a. Due to not being subjected to polarization or optical rotation in this process, the light flux that is incident on the light receiving element 1405a is light flux that is polarized in the 135-degree direction as shown by c4. As a result, light flux that had a 135-degree direction before being incident on the optical rotator is incident on the light receiving element 1405a.

Next, in the case of the light flux B-B' in FIG. 14B, at d1 before being incident on the optical rotator 1106, similarly to c1, the light flux is made up of random light beams, and is incident on the optical rotator 1106 without being polarized or optically rotated. Next, as shown by d2, which is the result of passing through the left side 1106b of the optical rotator 1106, the light flux merely passes through, and thus has not been polarized or optically rotated. In other words, the light flux having a 0-degree direction before incidence remains unchanged with a 0-degree direction. Next, in the case of passing through the polarizer 1114, only the 45-degree direction light is selected out of the incident light. Specifically, as shown by d3, the light flux that is polarized in the 45-degree direction passes through the polarizer 1114. Thereafter, this light flux passes through the on-chip microlens 1404 and is incident on the light receiving element 1405b. Due to not being subjected to polarization or optical rotation in this process, the light flux that is incident on the light receiving element 1405b is light flux that is polarized in the 45-degree direction as shown by d4. As a result, light flux that had a 45-degree direction before being incident on the optical rotator is incident on the light receiving element 1405b.

In other words, in the case of the light flux A-A' in FIG. 14B, light that was polarized in the 135-degree direction before incidence is incident on the light receiving element 1405a, and in the case of the light flux B-B', light that was polarized in the 45-degree direction before incidence is incident on the light receiving element 1405b.

Returning to the description of FIG. 12A, light beams that have passed through the upper portion 1106a of the optical rotator 1106 are subjected to +90-degree optical rotation and then pass through the polarizer 1114, and thus light beams that were polarized in the 135-degree direction before incidence are received by, among the light receiving elements of the image sensor 1107, the light receiving elements 1209a, 1210a, and 1211a that are on the lower side in the figure. Similarly, light beams that have passed through the lower portion 1106b of the optical rotator 1106 pass through the polarizer 1114 as is, and thus light beams that were polarized in the 45-degree direction before incidence are received by, among the light receiving elements of the image sensor 1107, the light receiving elements 1209b, 1210b, and 1211b that are on the upper side in the figure. In other words, the light beams that are received by the light receiving elements 1209a, 1210a, and 1211a on the lower side are light beams that were polarized in the 135-degree direction, and the light beams that are received by the light receiving elements 1209b, 1210b, and 1211b on the upper side are light beams that were polarized in the 45-degree direction. Accordingly, light beams having polarizations that are different from each other by 90 degrees are received. Accordingly, similarly to the first embodiment, the image output from the set of light receiving elements on the upper side in the figure and the image output from the set of light receiving elements on the lower side in the figure are images that have different polarization characteristics, that is to say, are respectively the image A having a polarization characteristic in the 135-degree direction and the image B having a polarization characteristic in the 45-degree direction.

In other words, in the case where the polarizer 1114 has a polarization characteristic in the 90-degree direction, the image A and the image B are a set of images having polarization characteristics of 0 degrees and 90 degrees, and in the case where the polarizer 1114 has a polarization characteristic of 45-degree direction, the image A and the image B are a set of images having polarization characteristics of 135 degrees and 45 degrees. Furthermore, the image A and the image B that are output have polarization characteristics that are different from each other by 90 degrees. In the configuration of the third embodiment, a polarizer and an optical rotator that has different rotary polarization directions in different optical path portions are used, and the polarizer is rotatable. Also, by adjusting the polarization direction of the polarizer, it is possible to set a more effective polarization direction and acquire polarized images.

Note that the optical rotator of the third embodiment can be configured using liquid crystal or a wave plate such as a half-wave plate or a quarter-wave plate. Also, there is no limitation to the rotary polarization characteristics of the optical rotator being divided into two, and similarly to the polarizer of the second embodiment, it may be divided into four.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-130681, filed Jun. 25, 2014, which is hereby incorporated by reference herein in its entirety.

What is claimed is:

1. An image capturing apparatus comprising:
an image sensor in which a plurality of light receiving elements are arrayed with respect to one lens on an image sensing plane on which an object image is formed by an imaging lens, the lens being arranged such that an exit pupil of the imaging lens and the light receiving elements are in a conjugate relationship;
a polarizer arranged at approximately a position of the exit pupil of the imaging lens, and having a plurality of areas that have different polarization directions corresponding to a plurality of different areas of the exit pupil; and
at least one processor or circuit configured to perform the operations of the following units:
an image processing unit that generates a plurality of images corresponding to the plurality of areas of the polarized from output of the in plurality of light receiving elements; and
a compositing unit that divides each of the plurality of images into a plurality of block areas, obtains polarization information for each block area by comparing images of corresponding block areas in the plurality of images, and composites the plurality of mages based on the obtained polarization information for each block area.

2. The image capturing apparatus according to claim 1, wherein an array of the plurality of areas of the polarizer and an array of the plurality of light receiving elements with respect to the one lens have a relationship of corresponding to each other.

3. The image capturing apparatus according to claim 2, wherein the polarizer has two areas with polarization directions that are different from each other by 90 degrees, and the image sensor has two light receiving elements with respect to the one lens, the two light receiving, elements corresponding to the two areas of the polarizer.

4. The image capturing apparatus according to claim 3, wherein each of the two light receiving elements receives light that passed through a corresponding one of the two areas of the polarizer.

5. The image capturing apparatus according to claim 1, wherein an image compositing unit generates an image in which specular reflection in an object has been removed or an image in which specular reflection of an object has been enhanced, by compositing the plurality of images.

6. An image capturing apparatus comprising:
an image sensor in which a plurality of light receiving elements are arrayed with respect to one lens on an image sensing plane on which an object image is formed by an imaging lens, the lens being arranged such that an exit pupil of the imaging lens and the light receiving elements are in a conjugate relationship;
a polarizer arranged at approximately a position of the exit pupil of the imaging lens, and having a plurality of areas that have different polarization directions corresponding to a plurality of different areas of the exit pupil; and
at least one processor or circuit configured to perform the operations of the following units:
an image processing unit that generates a plurality of images corresponding to the plurality of areas of the polarizer from output of the plurality of light receiving elements; and
a compositing unit that divides each of the plurality of images into a plurality of block areas, and composites the plurality of images by comparing images of corresponding block areas in the plurality of images and selecting a block area having a lowest luminance value.

7. The image capturing apparatus according to claim 6, wherein an image compositing unit generates an image in which specular reflection in an object has been removed or an image in which specular reflection of an object has been enhanced, by compositing the plurality of images.

8. An image capturing apparatus comprising:
an image sensor in which a plurality of light receiving elements are arrayed with respect to one lens on an image sensing plane on which an object image is formed by an imaging lens, the lens being arranged such that an exit pupil of the imaging lens and the light receiving elements are in a conjugate relationship;
a polarizer arranged at approximately a position of the exit pupil of the imaging lens, and having a plurality of areas that have different polarization directions corresponding to a plurality of different areas of the exit pupil; and
at least one processor or circuit configured to perform the operations of the following units:
an image processing unit that generates a plurality of images corresponding to the plurality of areas of the polarizer from output of the plurality of light receiving elements; and
a compositing unit that divides each of the plurality of images into a plurality of block areas, and composites the plurality of images by comparing images of corresponding block areas in the plurality of images and selecting a block area having a highest luminance value.

9. The image capturing apparatus according to claim 7, wherein an image compositing unit generates an image in which specular reflection in an object has been removed or an image in which specular reflection of an object has been enhanced, by compositing the plurality of images.

10. A method of controlling an image capturing apparatus including an image sensor in which a plurality of light receiving elements are arrayed with respect to one lens on an image sensing plane on which an object image is formed by an imaging lens, the lens being arranged such that are exit pupil of the imaging lens and the light receiving elements are in a conjugate relationship, a and a polarizer arranged at approximately a position of the exit pupil of the imaging lens, and having a plurality of areas that have different polarization directions corresponding to a plurality of different areas of the exit pupil, the method comprising:
generating a plurality of images corresponding to the plurality of areas of the polarizer from output of the plurality of light receiving elements; and
dividing each of the plurality of images into a plurality of block areas;
obtaining polarization information for each block area by comparing images of corresponding block areas in the plurality of images; and
compositing the plurality images based on the obtained polarization information for each block area.

* * * * *